(12) United States Patent
Abbarin

(10) Patent No.: US 7,030,733 B2
(45) Date of Patent: Apr. 18, 2006

(54) POWER SUPPLY FOR PHANTOM-FEED LAN CONNECTED DEVICE USING SPARE-PAIR POWERING

(75) Inventor: Hamidreza Abbarin, Ottawa (CA)

(73) Assignee: Mitel Knowledge Corporation, Ontario (CA)

( * ) Notice: Subject to any disclaimer, the term of this patent is extended or adjusted under 35 U.S.C. 154(b) by 624 days.

(21) Appl. No.: 10/348,839

(22) Filed: Jan. 22, 2003

(65) Prior Publication Data

US 2003/0162449 A1    Aug. 28, 2003

(30) Foreign Application Priority Data

Jan. 22, 2002    (GB) .................................... 0201399

(51) Int. Cl.
*G05B 11/01*    (2006.01)
(52) U.S. Cl. ..................... 340/310.11; 307/17; 307/24; 379/399.01; 370/200
(58) Field of Classification Search ............ 340/310.11
See application file for complete search history.

(56) References Cited

U.S. PATENT DOCUMENTS

| | | | | |
|---|---|---|---|---|
| 4,533,914 A | * | 8/1985 | Norling et al. ............. | 379/242 |
| 4,733,389 A | * | 3/1988 | Puvogel ...................... | 370/200 |
| 4,953,055 A | * | 8/1990 | Douhet et al. .............. | 379/250 |
| 5,148,144 A | * | 9/1992 | Sutterlin et al. ........ | 340/310.15 |
| 6,147,963 A | * | 11/2000 | Walker et al. .............. | 370/200 |
| 6,218,930 B1 | * | 4/2001 | Katzenberg et al. ... | 340/310.11 |
| 6,459,275 B1 | * | 10/2002 | Ewalt et al. ................. | 324/539 |
| 6,480,122 B1 | * | 11/2002 | Oddy et al. ................. | 340/999 |
| 6,541,878 B1 | * | 4/2003 | Diab ........................... | 307/17 |
| 6,640,308 B1 | * | 10/2003 | Keyghobad et al. ........ | 713/300 |
| 6,961,303 B1 | * | 11/2005 | Binder ........................ | 370/200 |
| 2001/0009021 A1 | * | 7/2001 | Ellington et al. ........... | 710/129 |
| 2003/0072438 A1 | * | 4/2003 | Le Creff et al. ........ | 379/399.01 |

FOREIGN PATENT DOCUMENTS

| | | |
|---|---|---|
| GB | 2356326 | 5/2001 |
| WO | WO 9623377 A1 | 8/1996 |
| WO | WO 9854843 A1 | 12/1998 |
| WO | WO 0041496 A2 | 7/2000 |

* cited by examiner

*Primary Examiner*—Jeffery Hofsass
*Assistant Examiner*—Eric Blount
(74) *Attorney, Agent, or Firm*—F. Chau & Associates, LLC

(57) ABSTRACT

A system for providing power to a local area network LAN connected device via spare wire pairs from a phantom feed LAN, the system comprising a first connector for connecting to the LAN connected device; a second connector for connecting to a LAN hub; and means for redirecting current from signaling wires of said second connector to at least one spare wire pair of said first connector.

8 Claims, 2 Drawing Sheets

(PRIOR ART)

POWER SUPPLY FOR PHANTOM-FEED LAN CONNECTED DEVICE USING SPARE-PAIR POWERING

FIELD OF THE INVENTION

This invention relates generally to all network devices and more particularly to a telephone system for providing power to a phantom-feed LAN connected device designed to use "spare"-pair powering.

BACKGROUND OF THE INVENTION

Power can be provided to a LAN device such as an Ethernet LAN connected telephone (often referred to as an IP telephone) through spare-pair wires, for example, through the 7/8 pair of wires in an RJ-45 jack configuration. Alternatively, power can be supplied by phantom-feed powering (or by both phantom-feed and spare-pair powering).

When power is supplied by phantom-feed, power is fed from a LAN hub through the transmit and receive signal lines to the LAN device. For phantom-feed powering, autotransformers are used on the secondary side of the voice over Internet protocol (VOIP) transformer to prevent phantom-feed current from going to the main transformer.

Prior art LAN transformers do not include an autotransformer and are therefore not suitable for use in a phantom-feed LAN. On the other hand, prior art VOIP transformers are provided with built-in autotransformers. Such a prior art VOIP transformer is suitable for use with a phantom-feed LAN since phantom-feed current is prevented from going to the main transformer by the autotransformer. However, VOIP transformers (Ethernet transformers with powering capabilities) are more expensive than conventional transformers. Further, many devices are not designed for phantom-feed powering. Many devices are only functional with spare-pair powering and are not functional in a phantom-feed LAN. Also, devices designed for both phantom-feed and spare-pair capabilities are more expensive relative to devices designed only for spare-pair powering.

It is therefore desirable to provide an apparatus for providing power for a LAN connected devices (e.g. telephone) designed to use spare-pair powering but connected to a phantom-feed LAN.

SUMMARY OF THE INVENTION

Therefore, in accordance with the present invention there is provided a system for providing power to a local area network LAN connected device via spare wire pairs from a phantom feed LAN, the system comprising:

a first connector for connecting to said LAN connected device;

a second connector for connecting to a LAN hub; and means for redirecting current from signaling wires of said second connector to at least one spare wire pair of said first connector.

BRIEF DESCRIPTION OF THE DRAWINGS

A preferred embodiment of the present invention is described herein below with reference to the drawings in which.

DETAILED DESCRIPTION OF THE PREFERRED EMBODIMENT

Figure 1:
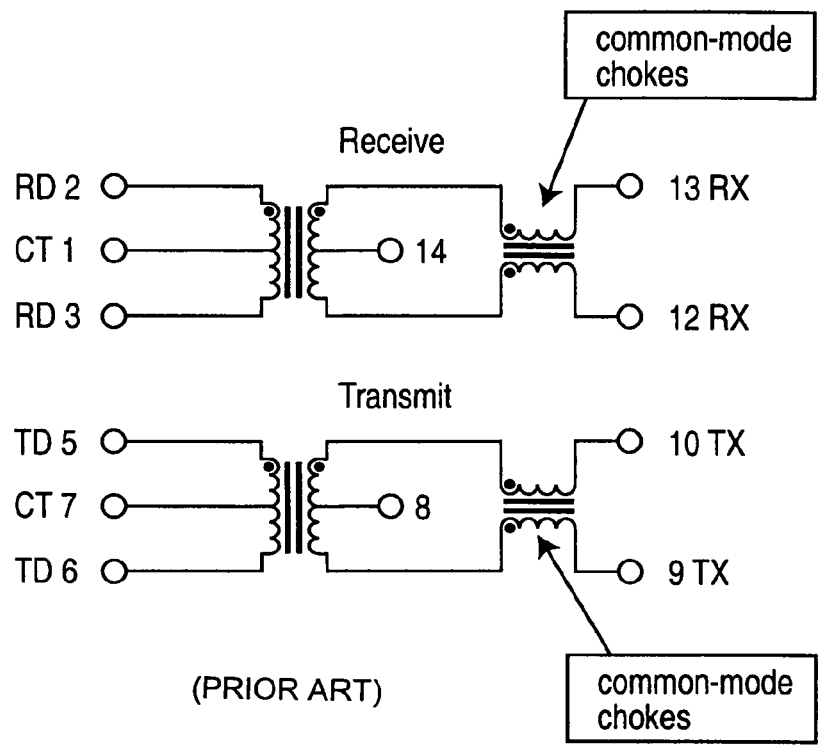
FIG. 1 is a schematic illustration of a prior art arrangement of a LAN transformer without an autotransformer.

FIG. 1 shows a prior art arrangement of a LAN transformer of a device not used in a phantom-feed LAN. This arrangement suffers from the disadvantage that it cannot be used in a phantom-feed LAN since, if the phantom-feed current goes through common-mode chokes, the common-mode chokes get saturated and are not useful anymore. Common-mode chokes are used to reduce or inhibit EMI, Electromagnetic Interference which comes out (radiation) or goes into (susceptibility) the device.

Figure 2:
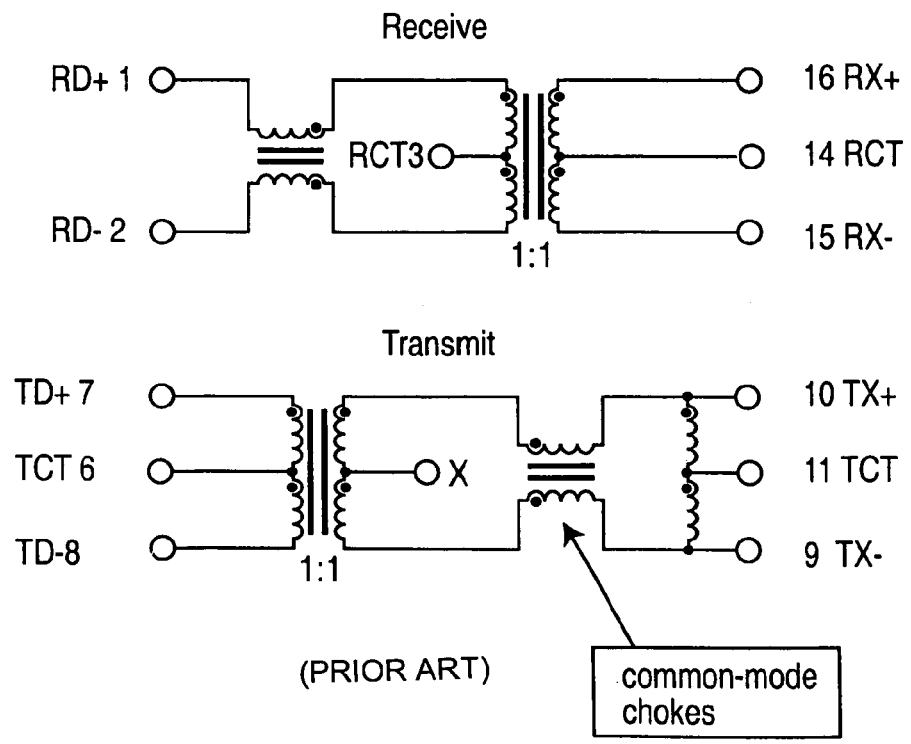
FIG. 2 is a schematic illustration of a prior art arrangement of a VOIP transformer (Ethernet transformer with powering capabilities), the transformer having a built in autotransformer on the transmit side.

FIG. 2 shows a prior art arrangement of a VOIP transformer of a device designed for use in a phantom-feed LAN. The autotransformer on the transmit side prevents phantom-feed current going through common-mode chokes and saturating them. As discussed above, such arrangements suffer from the disadvantages of being expensive and are not flexible for use in a spare-pair power arrangement.

Figure 3:
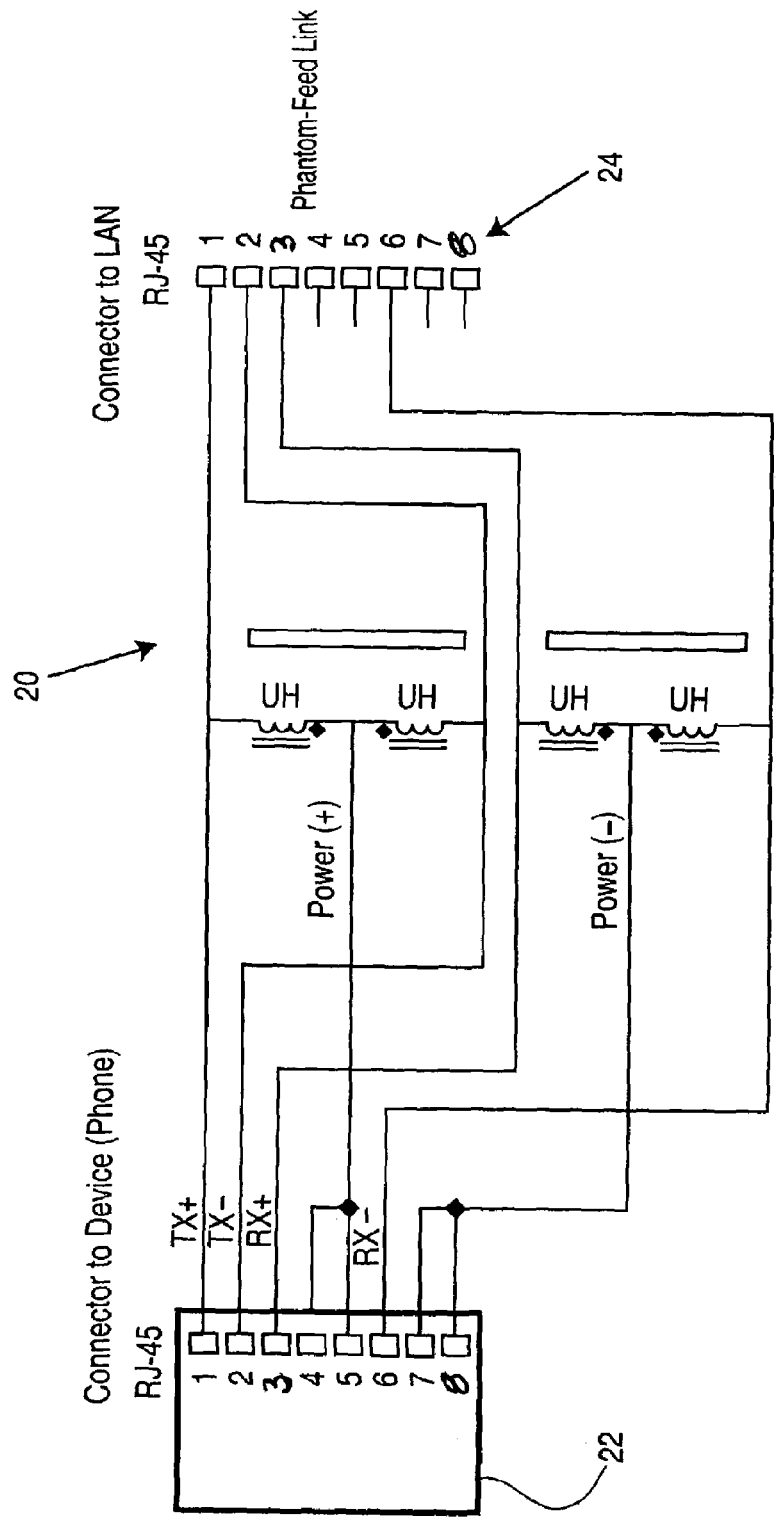
FIG. 3 is a schematic illustration of an apparatus for providing power to a phantom-feed LAN connected telephone designed to use spare-pair powering, according to an embodiment of the present invention.

Referring now to FIG. 3, a system is shown for providing power to a phantom-feed LAN connected device (for example, a telephone) designed to use spare-pair powering, as generally indicated by the numeral 20. The system of the present embodiment includes a pair of RJ-45 connectors. A first RJ-45 connector 22 is provided for connecting to a LAN device such as a telephone (not shown). As would occur to those of skill in the art, the first RJ-45 connector 22 includes signaling wires that include a pair of transmit wires corresponding to pair 1/2 and a pair of receive wires corresponding to pair 3/6. Two spare wire pairs are also provided, corresponding to pair 4/5 and pair 7/8. The use and function of the spare wire pairs will be further described herein below.

A second RJ-45 connector 24 is provided for connecting to a phantom feed LAN (not shown). The second RJ-45 connector 24 has signaling wires including transmit and receive wires corresponding to and connected to the transmit and receive wires of the first RJ-45 connector 22.

The transmit signaling wires of the second connector 24 are interconnected through an autotransformer. The spare-pair 4/5 of the first connector 22 are connected to the autotransformer (at the interconnection of the transmit signaling wires). Similarly, the receive signaling wires of the second connector 24 are interconnected through an autotransformer. The spare-pair 7/8 of the first connector 22 are connected to the autotransformer (at the interconnection of the receive signaling wires).

The present system is used where power is supplied by phantom-feed powering and the device to which it is connected is operable to be powered by spare-pair powering. In use, a LAN device operable to be powered by spare-pair powering is connected to the first connector 22. A phantom-feed powering LAN hub is connected to the second connector 24. Current is fed from the LAN hub through the transmit and receive signal lines to the apparatus 20. The current is redirected by the autotransformers in the apparatus 20, from the transmit 1/2 and receive 3/6 signal lines to the spare-pair pins 4/5 and 7/8 of the first connector 22. Thus, power is supplied to the LAN device via the spare wire pairs.

It will be understood that the particular embodiment that has been described and illustrated herein is exemplary of the invention and various changes and modifications can be made to this embodiment. For example, the LAN device can be a telephone set, as suggested, or can be a computer or any other suitable device connected to the LAN. Also, by adding parts such as an AC or DC adapter jack and two diode bridges, it is possible to provide power to a LAN connected device by an AC or DC adapter. This can be used when a remote powering system, phantom-feed or spare-pair does not exist and local powering is required. All such changes and modifications may be made without departing from the sphere and scope of the invention as defined by the claims appended hereto.

I claim:

1. A system for providing power to a local area network LAN connected device via spare wire pairs from a phantom feed LAN, the system comprising:
    a first connector for connecting to said LAN connected device;
    a second connector for connecting to a LAN hub; and
    means for redirecting current from signaling wires of said second connector to at least one spare wire pair of said first connector.

2. The system for providing power to a LAN connected device according to claim 1 wherein said means for redirecting current comprises at least one autotransformer between said signaling wires and said at least one spare wire pair.

3. The system for providing power to a LAN connected device according to claim 1 wherein said means for redirecting current redirects current to two spare wire pairs.

4. The system for providing power to a LAN connected device according to claim 3 wherein said means for redirecting current comprises a pair of autotransformers, each autotransformer being disposed between said signaling wires and said spare wire pair for preventing phantom-feed current from passing to a transformer in said device.

5. The system for providing power to a LAN connected device according to claim 4 wherein said first connector is an RJ-45 jack.

6. The system for providing power to a LAN connected device according to claim 5 wherein said second connector is an RJ-45 jack.

7. The system for providing power to a LAN connected device according to claim 6 wherein said spare wire pairs corresponds to pair 4/5 and pair 7/8 of said first connector.

8. The system for providing power to a LAN connected device according to claim 7 wherein said signaling wires correspond to transmit and receive wires of said device.

* * * * *